US012580336B2

(12) United States Patent
Zeier et al.

(10) Patent No.: US 12,580,336 B2
(45) Date of Patent: Mar. 17, 2026

(54) POWER OUTLET MODULE, A POWER OUTLET CONNECTOR BANK AND A TWO-PART ELECTRICAL COUPLING SYSTEM

(71) Applicant: SCHURTER AG, Lucerne (CH)

(72) Inventors: Joel Zeier, Rothenburg (CH); Cyrill Disler, Kriens (CH); Sarina Vetter, Lucerne (CH)

(73) Assignee: SCHURTER AG, Lucerne (CH)

( * ) Notice: Subject to any disclaimer, the term of this patent is extended or adjusted under 35 U.S.C. 154(b) by 168 days.

(21) Appl. No.: 18/546,327

(22) PCT Filed: Feb. 16, 2021

(86) PCT No.: PCT/EP2021/053782
§ 371 (c)(1),
(2) Date: Aug. 14, 2023

(87) PCT Pub. No.: WO2022/174889
PCT Pub. Date: Aug. 25, 2022

(65) Prior Publication Data
US 2024/0128670 A1 Apr. 18, 2024

(51) Int. Cl.
*H01R 13/10* (2006.01)
*H01R 13/514* (2006.01)
*H01R 24/76* (2011.01)

(52) U.S. Cl.
CPC ........... *H01R 13/10* (2013.01); *H01R 13/514* (2013.01); *H01R 24/76* (2013.01)

(58) Field of Classification Search
CPC ....... H01R 13/10; H01R 13/514; H01R 24/76
USPC .................................................... 439/79, 107
See application file for complete search history.

(56) References Cited

U.S. PATENT DOCUMENTS

| | | | | |
|---|---|---|---|---|
| 8,888,523 | B2 * | 11/2014 | Cao | H01R 25/006 439/107 |
| 10,186,802 | B1 | 1/2019 | Chen et al. | |
| 10,249,998 | B2 * | 4/2019 | Irons | H01R 33/72 |
| 10,498,096 | B2 * | 12/2019 | Irons | H01R 13/645 |
| 11,362,470 | B2 * | 6/2022 | Irons | H01R 33/94 |
| 2003/0124893 | A1 | 7/2003 | Campbell | |
| 2019/0020161 | A1 | 1/2019 | Irons et al. | |
| 2019/0140410 | A1 | 5/2019 | Hutchison et al. | |

FOREIGN PATENT DOCUMENTS

| | | |
|---|---|---|
| CN | 211428413 U | 9/2020 |
| EP | 3 471 522 A2 | 4/2019 |

* cited by examiner

*Primary Examiner* — Gary F Paumen
(74) *Attorney, Agent, or Firm* — Rothwell, Figg, Ernst & Manbeck, P.C.

(57) ABSTRACT

A power outlet module, comprising an electrically insulating unitary body, said unitary body comprising a base and an outlet core extending from said base. Said outlet core comprises a plurality of recesses extending in longitudinal direction thereof. The power outlet module further comprises a plurality of terminals made of an electrically conductive material each positioned in one of the plurality of recesses. The terminals each extend in a plane, each terminal including two legs extending in parallel to each other, facing each other with a predetermined gap in-between. The two legs at one end merge into a merging portion, said legs being bendable via the merging portion in a direction parallel to the plane.

14 Claims, 6 Drawing Sheets

POWER OUTLET MODULE, A POWER OUTLET CONNECTOR BANK AND A TWO-PART ELECTRICAL COUPLING SYSTEM

CROSS REFERENCE TO RELATED APPLICATION

This application is a 35 U.S.C. 371 National Phase Entry Application from PCT/EP2021/053782, filed Feb. 16, 2021, the disclosure of which is incorporated herein by reference in its entirety.

TECHNICAL FIELD

The present invention is related to a power outlet module, a power outlet connector bank and a two-part electrical coupling system.

BACKGROUND OF THE INVENTION

A power outlet connector bank is an assembly of electrical power outlets that receive electrical power from a source and distribute the electrical power to one or more separate electronic appliances. Each such power outlet connector bank has a power input that receives power from a power source, and power outlet modules that may be used to provide power to one or more electronic appliances. Such power outlet connector bank can be used in applications and settings such as, for example, in or on electronic equipment racks. A single power outlet connector is also named appliance outlet, the power outlet connector bank is also named power distribution unit (PDU).

Different power outlet modules are known, each allowing to be connected with plugs of a compliant connector type, respectively. In an example, a so-called appliance outlet F (C13 connector) can be connected with a corresponding plug connector E (C14 appliance inlet), while a so-called appliance outlet J (C19 connector) can be connected with a corresponding plug connector I (C20 appliance inlet). According to IEC standard, the pair F, E is to be used for 10 A maximum current, whereas the pair J, I is to be used for 16 A maximum current. The geometry of appliance outlet J prevents, as an example, that a plug connector E is erroneously connected to it.

It is a problem in the state of the art to design power outlet module with a keying property as described above, i.e., preventing erroneous coupling to a wrong plug connector. Such a keying property often collides with other requirements, such as space requirements or electrical insulation.

It is therefore an object of the present invention to provide a power outlet module, a power outlet connector bank and a two-part electrical coupling system eliminating the indicated problem.

SUMMARY OF THE INVENTION

The present invention is directed to a power outlet module according to claim 1, a power outlet connector bank according to claim 13 and a two-part electrical coupling system according to claim 14, the system allowing interaction between distinct connector types.

The invention relates to a power outlet module, comprising an electrically insulating unitary body, said unitary body comprises a base and an outlet core extending from said base. Said outlet core comprises a plurality of recesses extending in longitudinal direction thereof. The power outlet module further comprises a plurality of terminals made of an electrically conductive material each positioned in one of the plurality of recesses. The terminals each extend in a plane, each terminal including two legs extending in parallel to each other, facing each other with a predetermined gap in-between. The two legs at one end merge into a merging portion, said legs being bendable via the merging portion in a direction parallel to the plane.

The inventor has recognized that the terminals with the specific features as discussed above can be arranged in a very space-saving way. This allows for power outlet modules having a previously unknown pattern of recesses adapted to receive male connectors of a plug connector. As a specific example, features of which are discussed in more detail below, the space-saving terminal enables the design of a power outlet module, which can be compliant with plugs of distinct plug connector types, e.g., two plug connector types. As an example, a power outlet module according to the invention may be designed to alternatively being connected to a plug connector E, if 10 A is required, or to a plug connector I, if 16 A is required. Due to the space-saving terminal, the pattern of the total of six openings needed in this case may be arranged on a front face of the outlet, without touching each other. This enables to keep the 10 A supply line and the 16 A supply line completely separate, while providing the possibility to switch between both options. Only a single power outlet module is needed to provide both options.

Terminals respectively received in each recess of the power outlet module extend in a (single) plane, each terminal including two legs extending in parallel to each other such to face each other with a predetermined gap in-between. The two legs at one end thereof merge into a merging portion such to allow said legs bend via the merging portion in a direction parallel to the plane. This configuration of the terminals, due to the slim design thereof, allows arrangement of the plurality of terminals to each other with less distance than known in the prior art while still allowing reliable electrical connection and reliable mechanical connection with male connectors, respectively, providing sufficient insulation, etc.

Further, some of the terminals of the plurality of terminals can be oriented such that planes thereof can be angled or rather can extend perpendicular to each other, which can further allow arrangement thereof with less distance to each other. In contrast to the prior art, in the space-limited cross section of a given outlet core, the present invention allows equipping the outlet core with an increased number of terminals, while still allowing reliable engagement with male connectors, respectively, of a plug of some kind of plug connector type.

In an example, the outlet core can be equipped with six terminals as a whole, wherein three terminals are adapted to receive male connectors of a plug of a first connector type and further three terminals are adapted to receive male connectors of a plug of a second connector type. This configuration allows to provide the outlet core with a number of terminals allowing to be engaged with male connectors of a plug of distinct connector types, e.g., two distinct connector types. In other words, a power outlet module is proposed which can be connected with a plug of a first plug connector type or a plug of a second plug connector type. As discussed above, the first plug connector type may be a plug connector E and the second plug connector type may be a plug connector I. Plug connector E and plug connector I have three male connector pins each. In both cases, the three male connector pins are arranged in form of an isosceles triangle. The male connector pins have an elongated cross-section. The orientation of this cross-section with respect to the basis of the isosceles triangle is rotated by 90 degrees, when comparing plug connector E to plug connector I. This variation in orientation of the male connector pins prevents wrong coupling. This variation in orientation makes it difficult to arrange corresponding openings in a single core of a power outlet module. With the features of the power outlet module according to the invention, a surprisingly simple solution of integrating recesses for plug connectors E and I into one and the same core becomes possible.

In an embodiment of the proposed power outlet module the inner walls of each of the recesses are formed with two slits extending in axial direction of the recesses such to face each other. The terminals each can be inserted into the recesses, guided by the slits, from the base-side of or rather from behind the power outlet module.

In an embodiment of the proposed power outlet module the slits extend along the recesses in a portion thereof between the base and a position being distant from a distal end of the outlet core by a predetermined length. The terminals each abut against the ends or rather abutments of the slits such to allow sufficient distance from the distal end or rather front face of the outlet core by a predetermined length. Therefore, electrical insulation requirements can be complied with.

In an embodiment of the proposed power outlet module the slits of each of the recesses receive the legs of the terminals. The slits each can be configured such to receive one of the terminals by the legs thereof. In an example, at least one of the legs of a respective terminal can be provided with a bulge projecting into the gap defined by the legs.

In an embodiment the proposed power outlet module further comprises means for preventing incorrect coupling. In an embodiment the means for preventing incorrect coupling comprises at least one keying element along the periphery of the outlet core. In an example, the outlet core is formed with a periphery or rather outer surface configured to mate with a surface of a plug of at least one admissible connector type, e.g., by the inner periphery of the plug. Hence, false connection or rather inadmissible electrical connection can be prevented.

In an embodiment the proposed power outlet module further comprises a sidewall extending from said base, said sidewall surrounding the base. In an example, the sidewall is formed with a periphery or rather has an inner surface configured to mate with a surface of a plug of at least one admissible connector type, e.g., by the outer periphery of the plug, thus preventing inadmissible electrical connection.

In an embodiment of the proposed power outlet module the outlet core comprises a periphery adapted to mate with an inner surface of a first connector type, and wherein the sidewall comprises a periphery or rather inner surface adapted to mate with an outer surface of a second connector type. This embodiment provides a combined power outlet module allowing the power outlet module to be connected with a plug of a first connector type or a plug of a second connector type. As an example, the first plug connector type may be a plug connector E and the second plug connector type may be a plug connector I.

In an embodiment of the proposed power outlet module the recesses comprise a first set of recesses and a second set of recesses, wherein said first set of recesses are arranged and dimensioned such to mate with male connectors of said first connector type, and said second set of recesses are arranged and dimensioned such to mate with male connectors of said second connector type. In an example, the power outlet module can be provided with six recesses as a whole, three recesses (e.g., the first set of recesses) thereof arranged and dimensioned such to mate with male connectors of the first plug connector type and the remaining three recesses (e.g., the second set of recesses) thereof arranged and dimensioned such to mate with male connectors of the second plug connector type. Again, as an illustrative example, the first plug connector type may be a plug connector E and the second plug connector type may be a plug connector I. Dimensions of the plug types E and I are defined by the IEC standard.

In an embodiment of the proposed power outlet module the distal end of the outlet core defines a front face having apertures, wherein the recesses extend into the apertures.

In an example, the apertures and recesses can be formed continuous. In an embodiment of the proposed power outlet module each of the apertures is formed oblong.

In an embodiment of the proposed power outlet module the terminals each are received into the slits of the recesses such that the plane of each of the terminals is perpendicular to the oblong extension of the apertures. This configuration in combination with the slim design of the terminals allows the outlet core to be equipped with an increased number of terminals. Further, increased flexibility in arranging the terminals can be achieved. Further, due to the flexibility, the terminals can be arranged such to achieve maximum insulation between e.g., adjacent terminals.

In an embodiment of the proposed power outlet module the terminals each comprise a pin portion extending from the merging portion. The pin portion can extend in the same plane as the remainder body of the terminal. Hence, a terminal can be provided which extends in a single, slim plane as a whole.

In an embodiment the proposed power outlet module further comprises a lid adapted to be engaged with the base, said lid comprises a plurality of conducts positioned such to be penetrated by the pin portions of the inserted terminals. The pin portions of each of the terminals can protrude from the lid of the power outlet module at the rear side thereof, adapted to be electrically connected with external connecting means as e.g., provided in the power outlet connector bank. The lid, once engaged with the base of the power outlet module, reliably fixes the terminals. Each of the terminals, by the merging portion thereof, can abut against the rear side of the lid once engaged with the base, while the distal ends of the legs abut against the above mentioned ends or rather abutments of the slits. Therefore, axial movement of the terminals can be inhibited by the lid once engaged with the base. A separation between core and lid may be designed to have a different geometry.

The invention further relates to a power outlet connector bank comprising at least one power outlet module according to one of claims 1 to 14. Provided is a power outlet connector bank equipped with one or a plurality of power outlet modules according to the present embodiment. This configuration eliminates the necessity to provide the power outlet connector bank with a plurality of commonly known power outlet modules complying with e.g., a first connector type and a further plurality of commonly known power outlet modules complying with e.g., a second connector type. Hence, further advantageously, density of the power outlet connector bank can be increased, saving at least space and costs, without suffering reduced connectability. Continuing the example discussed above in connection with the single power outlets, the space occupied by a power outlet connector bank according to the invention may be used to provide connections to a 10 A system or alternatively to a 16 A system. The power outlet connector bank installed in a server rack does not need to be exchanged if servers are upgraded to a version having higher or lower power consumption and accordingly have plug connectors of another type than the originally installed servers. The power outlet module according to the invention may be combined with conventional power outlet modules in the same power outlet connector bank. Advantageously, all power outlet modules in the connector bank are power outlet modules according to the invention.

Moreover, the present invention is directed to a two-part electrical coupling system according to claim 14. The two-part system comprises as first part a power outlet module according to the invention or a power outlet connector bank according to the invention. The system comprises as second part a plug releasably connectable to the first part. The plug has male connectors arranged and dimensioned to fit into corresponding recesses of the first part and to establish electrical connections to corresponding terminals. In particular, first and second parts of the coupling system may comply with a standard, such as the IEC standard. As an example, first and second parts of the coupling system may be formed by the pair appliance outlet F and plug connector E, or by the pair appliance outlet J and plug connector I. There may be more recesses in the power outlet module being the first part of the system than male connectors of the second part. This way, a plug of another type, having male connectors at different positions, may alternatively be connected to the first part. In the above example, a connection to plug connector E or alternatively to plug connector I may be enabled.

It is expressly pointed out that any combination of the above-mentioned embodiments is subject of further possible embodiments. Only those embodiments are excluded that would result in a contradiction.

BRIEF DESCRIPTION OF THE DRAWINGS

The present invention is further described with reference to the accompanying drawings jointly illustrating various exemplary embodiments which are to be considered in connection with the following detailed description. What is shown in the figures is.

DETAILED DESCRIPTION OF THE INVENTION

Figure 1A:
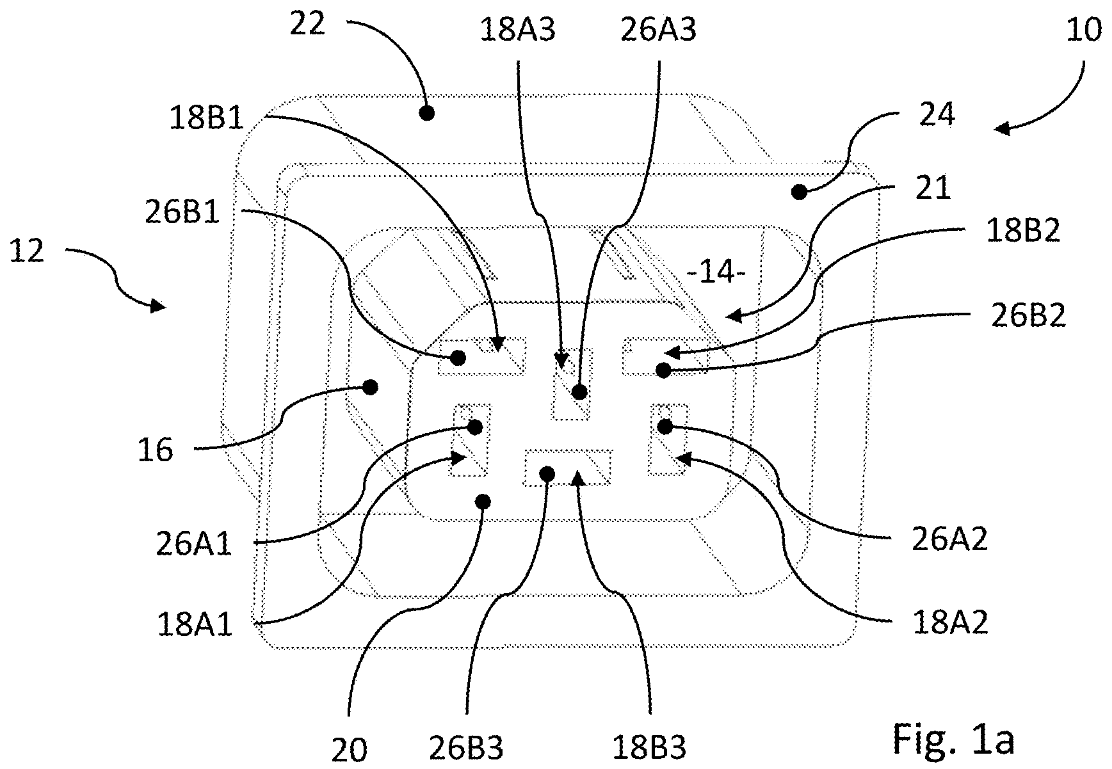
FIGS. 1*a,b* depict a power outlet module in different front views.
Figure 2A:
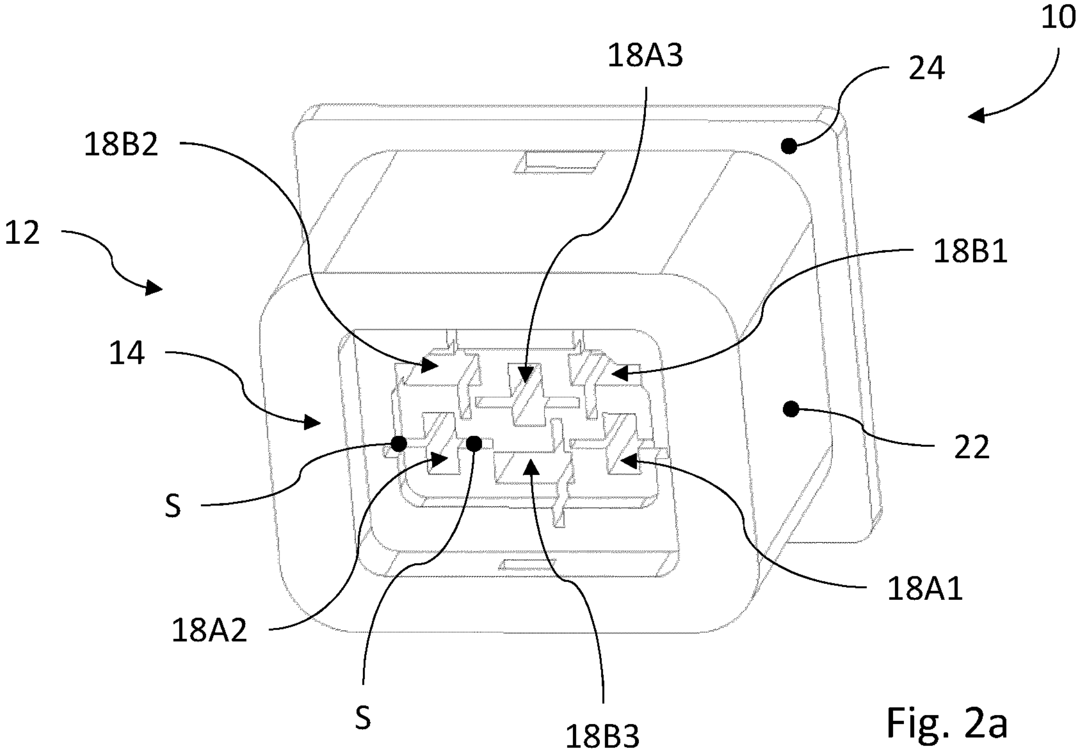
FIGS. 2*a,b* depict the power outlet module in different rear views with a base thereof uncovered.
Figure 2B:
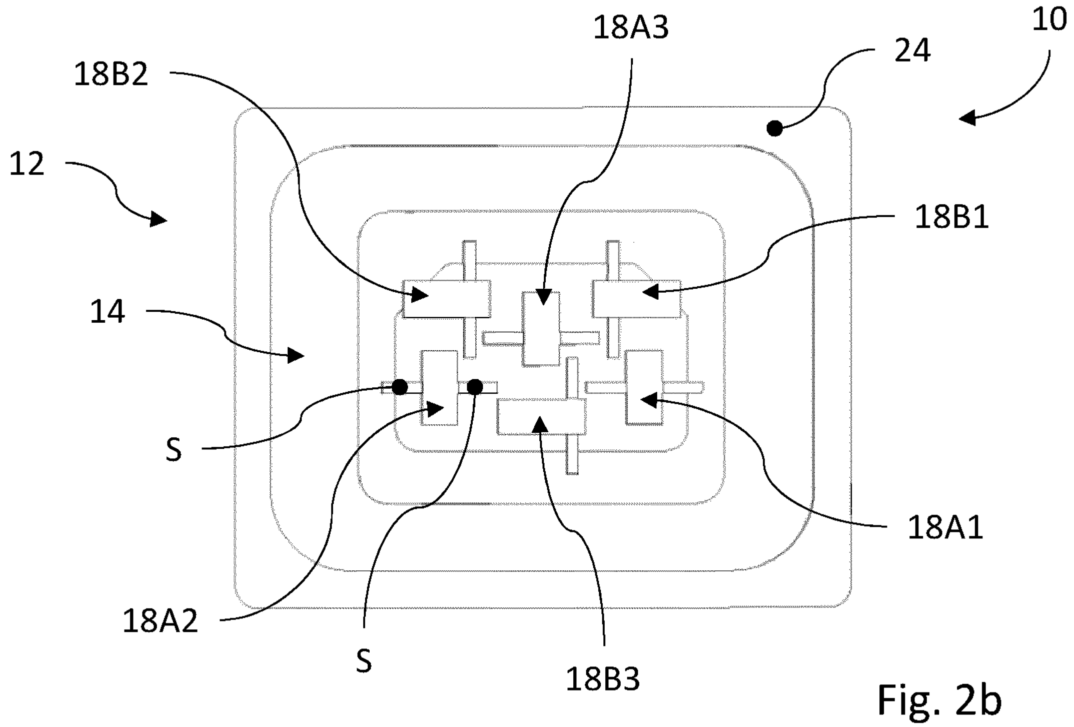

FIGS. 1*a,b* depict a power outlet module 10 in different front views, while FIGS. 2*a,b* depict the power outlet module 10 in different rear views. The power outlet module can be used to supply power to an electronic appliance via a plug (both not shown). The power outlet module 10 comprises a unitary body 12 made of an electrically insulating material, e.g., plastic. The unitary body 12 comprises a base 14 and an outlet core 16 extending from said base 14. In the case illustrated here, both are formed integrally. Additional or alternative variants for separations are conceivable as explained in the following.

The power outlet module shown in these figures may be seen as a combination power module, which combines the possibility to connect different plug connectors, depending on the requirements of the appliance to be connected.

The outlet core 16 comprises a plurality of recesses 18A1-18A3, 18B1-18B3 extending in longitudinal direction of the outlet core 16. Each of the recesses 18A1-18A3, 18B1-18B3 is adapted to receive a respective male connector of a plug (not shown) equipped with a plurality of male connectors, e.g., three male connectors. The outlet core 16 is adapted to engage with plugs of distinct connector types, e.g., two distinct types. In the shown example, the outlet core 16 comprises six recesses 18A1-18A3, 18B1-18B3 comprising a first set of recesses 18A1-18A3 and a second set of recesses 18B1-18B3. The first set of recesses 18A1-18A3 are arranged and dimensioned such to mate with male connectors of a plug of a first connector type. The second set of recesses 18B1-18B3 are arranged and dimensioned such to mate with male connectors of a plug of a second connector type.

The distal end of the outlet core 16 defines a front face having apertures, wherein the recesses 18A1-18A3, 18B1-18B3 can extend into the apertures. In the shown example, the apertures comprise the same dimension and orientation as that of the cross-section of the recesses 18A1-18A3, 18B1-18B3, respectively. The apertures (and thus the cross-section of the recesses 18A1-18A3, 18B1-18B3) are formed oblong. The oblong apertures of the first set of recesses 18A1-18A3 extend in vertical direction, while the oblong apertures of the second set of recesses 18B1-18B3 extend in horizontal direction.

The periphery or rather outer surface of the outlet core 16 comprises keying elements 21 which can comprise means for preventing incorrect coupling, e.g., coupling with an inadmissible plug. However, the keying elements 21 can be formed such to allow to mate with an admissible plug. In an example, the periphery of the outlet core 16 can be adapted to mate with an inner surface of a plug of a respective connector type, e.g., a first connector type, but can also admit, or rather not exclude, connection with a plug of a different connector type, e.g., a second connector type. However, coupling with a further, e.g., inadmissible plug, can be prevented due to the keying elements 21.

The power outlet module 10 further comprises a sidewall 22 extending from the base 14 in the same direction as the outlet core 16. The sidewall 22 surrounds the base 14 and thus the outlet core 16. The base 14, the sidewall 22 and the outlet core 16 can be formed integrally. The sidewall 22 comprises a periphery or rather inner surface which can be adapted to mate with an outer surface of a plug which can be distinct from the plug mentioned above, e.g., a plug of a second connector type. However, the sidewall 22 can be formed such to also admit, or rather not exclude, connection with a plug of a different connector type, e.g., the first connector type. However, coupling with a further, e.g., inadmissible plug, can be prevented. The distal end of the sidewall 22 can be provided with a flange 24 or rather cantilever extending circumferentially. The outer surface of the flange 24 and the front face 20 of the outlet core 16 can be formed such to be flush to each other.

The recesses 18A1-18A3, 18B1-18B3 each comprise inner walls 26A1-26A3, 26B1-26B3, wherein each of the inner walls 26A1-26A3, 26B1-26B3 are formed with two slits S extending in axial direction of a respective one of the recesses 18A1-18A3, 18B1-18B3. The slits S of each pair of slits are formed or rather arranged such to face each other.

As mentioned above, in the case illustrated, the unitary body 12 comprises the base 14 and the outlet core 16 extending from said base 14, wherein the base 14 and outlet core 16 both are formed integrally. Additional or alternative variants for separations are conceivable, separations between base 14 and outlet core 16, between a part of the outlet core 16 and the front face 20 or between the base 14 and the sidewall 22.

Figure 3:
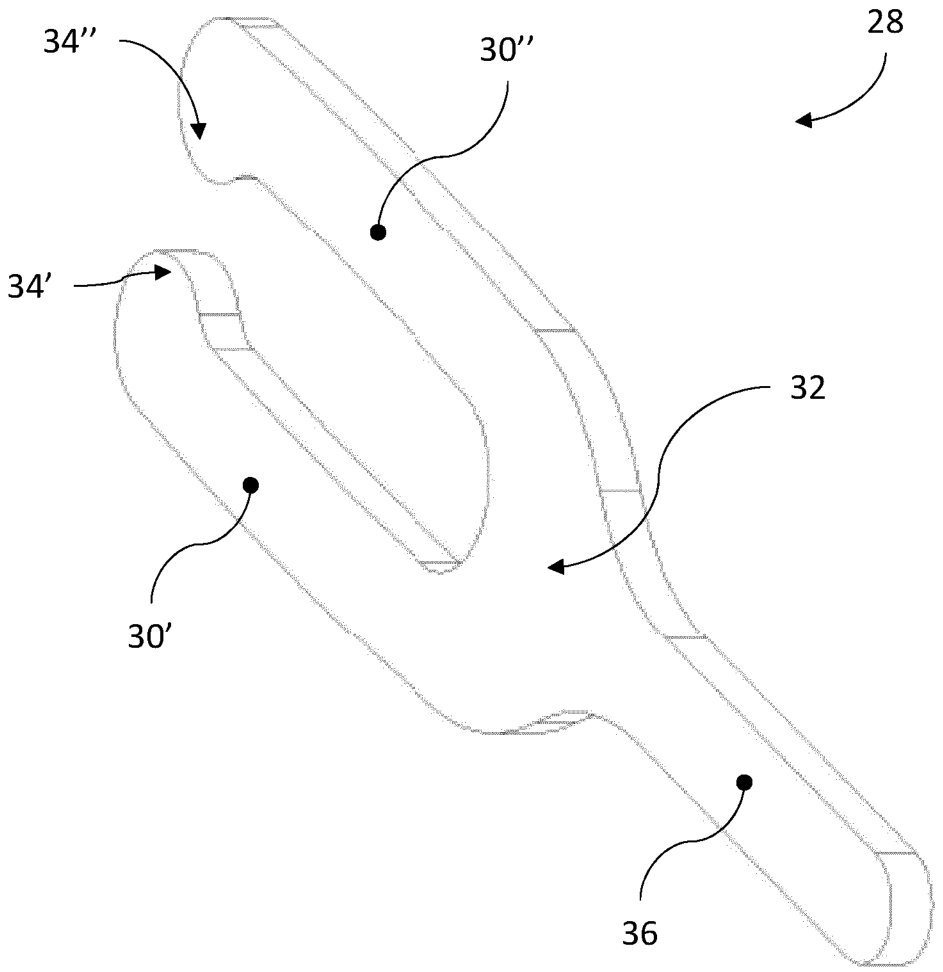
FIG. 3 depicts a terminal.

FIG. 3 depicts a terminal 28 representative for a plurality of terminals each adapted to be received by the pair of slits S in each of the recesses 18A1-18A3, 18B1-18B3. The terminal 28 having the specific geometry shown provides a very space-saving electrical contact element. The terminals 28 are made of an electrically conductive material, e.g., copper or a copper alloy. Further, the terminals 28 each are formed such to extend in a plane. Furthermore, each terminal 28 includes two legs 30',30" extending in parallel to each other, facing each other with a predetermined gap in-between. The two legs 30',30", at one end thereof, merge into a merging portion 32. This design allows said legs 30',30" to bend or rather to flex via the merging portion 32, said bending is in a direction parallel to the plane of the terminal 28. The distal ends of the legs 30',30" can each be provided with a bulge 34',34" or rather projection formed rounded, the bulges 34',34" projecting inwardly or are rather directed such to face each other.

The terminals 28 are adapted to elastically sandwich a respective male connector of a plug (not shown) via the legs 30',30" such to establish electrical connection. The male connector can be sandwiched by inserting and subsequently sliding the male connector into the gap defined by the two bulges 34',34" of the legs 30',30". The bulges 34',34" then form contacting points to the male connector. Such insertion can be facilitated by means of forming the distal ends or rather tips of the legs 30',30" rounded. During insertion, the male connector has to pass a gap defined by the minimum distance between the two bulges 34',34" facing each other. This gap can be less than a thickness or rather depth of the male connector, resulting in, during insertion, the two legs 30',30" are bended or rather flexed outside to an extend that allows insertion of the male connector. In doing so, the legs 30',30" are bended outside via the merging portion 32 in a direction parallel to the plane of the terminal 28. Due to restoring force, the legs 30',30" are snuggly pressed, e.g., via the bulges 34',34", against the inserted male connector to an extend allowing reliable mechanical and electrical connection.

The terminal 28 further comprises a pin portion 36, which extends from the merging portion 32. The pin portion 36 can extend in a direction away from the legs 30',30" such that the terminal 28 extends in a single plane. However, there can be several different connection types between terminal and appliance, for some of these connection types, the respective IEC standard 60320-1 defines minimal clearances between the different pin portions 36. In order to assure clearances, it can be necessary to incline the pin portion within the initial plane formed by the legs 30',30", position the pin portion 36 asymmetrically to the legs 30',30" (still within the plane formed by legs 30',30"), incline the pin portion 36 out of the initial plane formed by the legs 30',30", or a combination of the three mentioned possibilities. Hence, a slim, space reducing configuration is achieved allowing to equip the outlet core 16 of the power outlet module 10 with an increased number of terminals.

Referring back to the power outlet module body 10, the slits S formed along each of the inner walls 26A1-26A3, 26B1-26B3 of the recesses 18A1-18A3, 18B1-18B3 can extend in a portion thereof between the base 14 and a position being distant from the distal end of the outlet core 16 by a predetermined length. Therefore, increased insulation can be achieved.

Referring to FIGS. 2*a,b*, the pairs of slits S can be respectively arranged in a portion of related recesses such to minimize interference between each other. A configuration can be achieved allowing maximum insulation of the respectively received terminals against each other. The slim design of the terminals advantageously contributes to this favourable configuration.

As mentioned before, the space saving, slim configuration of the terminals 28 can allow to equip the outlet core 16, which cross-section is limited in space, with six recesses as a whole. Three recesses 18A1-18A3 thereof, also referred as a first set of recesses, can extend in a direction perpendicular to the elongation of the front face 20. The recesses of said first set of recesses are arranged and dimensioned such to mate with male connectors of a plug of a first connector type, e.g., a plug connector E (C14 appliance inlet). Having regard to this, the power outlet module 10 can comply with an appliance outlet F (C13 connector).

The remaining recesses 18B1-18B3, also referred as a second set of recesses, can extend in a direction to the elongation of the front face 20. The recesses of said second set of recesses are arranged and dimensioned such to mate with male connectors of a plug of a second connector type, e.g., a plug connector I (C20 appliance inlet), which may be connected alternatively to the above mentioned plug connector E. Having regard to this, the power outlet module 10 can simultaneously comply with the requirements for an appliance outlet J (C19 connector) and with the requirements for an appliance outlet F. The geometry of the openings and the particular arrangement of the electrically conducting terminals have the effect that the 10 A electrical system (pair E, F) and the 16 A electrical system (pair I, J) are properly separated. No contact between the two systems is established when a plug connector of either type is connected to the power outlet module 10.

Figure 4A:
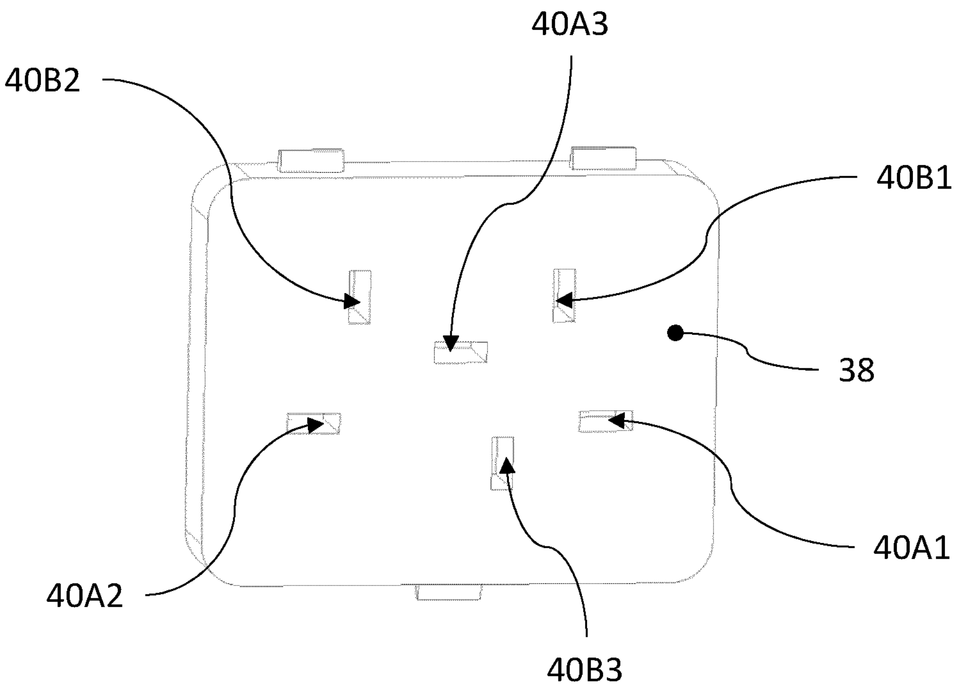
FIGS. 4*a,b* depict a lid and the power outlet module in a rear view with the base covered by the lid.

Referring to FIGS. 4*a,b*, the power outlet module 10 can further comprise a lid 38 adapted to be engaged with the base 14. The lid 38 can cover the base 14 from the rear side thereof once the terminals are inserted into the recesses (refer to FIGS. 1*a*-2*b*), respectively. The lid 38 is shown from the surface thereof facing to the outside once the lid 38 is engaged with the base 14. The lid 38 comprises a plurality of conducts 40A1-40A3, 40B1-40B3 positioned such to allow penetration thereof by the respective pin portions 36 of the inserted terminals 28, respectively. To allow for a better overview, the conducts 40A1-40A3, 40B1-40B3 are referenced such to correspond referencing of associated recesses (refer to FIGS. 1*a,b*). While not shown, as an alternative, the lid 38 may be formed integral with the base 14.

Figure 4B:
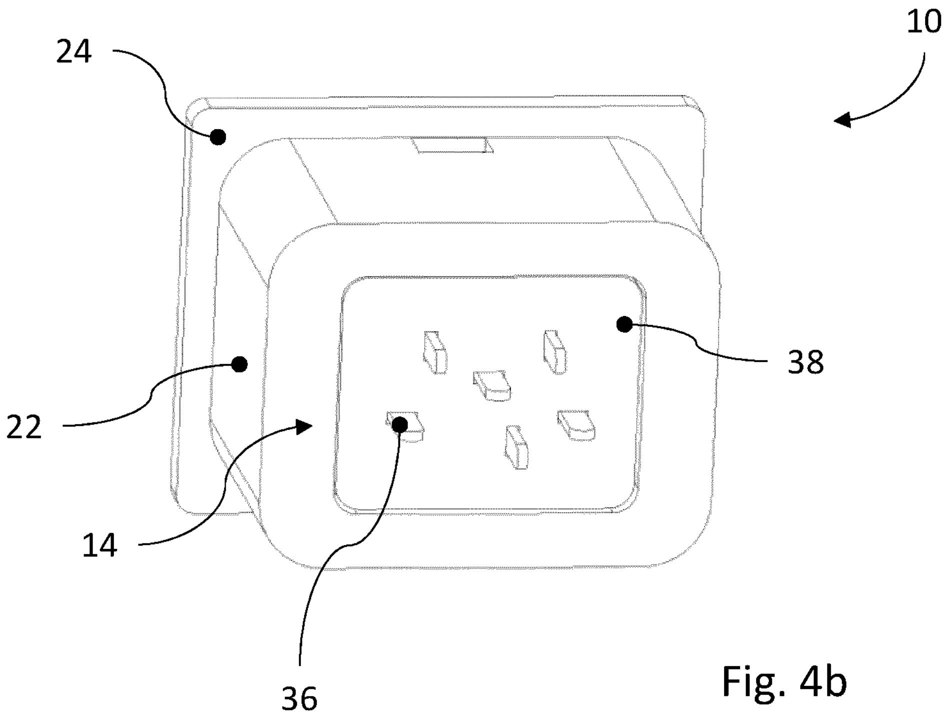

The proposed configuration allows that pin portions 36 of each of the terminals 28 can protrude from the lid 38 of the power outlet module 10 at the rear side thereof, as can be seen in FIG. 4*b*. The respective pin portions 36 can be electrically connected with external connecting means such as e.g., a printed circuit board, which can be provided in a power outlet connector bank (not shown).

The lid 38, once engaged with the base 14 of the power outlet module 10, allows reliable fixation of the inserted terminals, respectively. While not seen, each of the terminals, e.g., by the merging portion thereof (refer to FIG. 3), can abut against the rear side of the lid 38 once engaged with the base 14, while the distal ends of the legs (refer to FIG. 3) of each of the terminals can abut against the above mentioned ends or rather abutments of the slits in a front direction thereof. Therefore, advantageously, axial movement of the terminals 28 can be inhibited by the lid 38 once engaged with the base 14.

Figure 5:
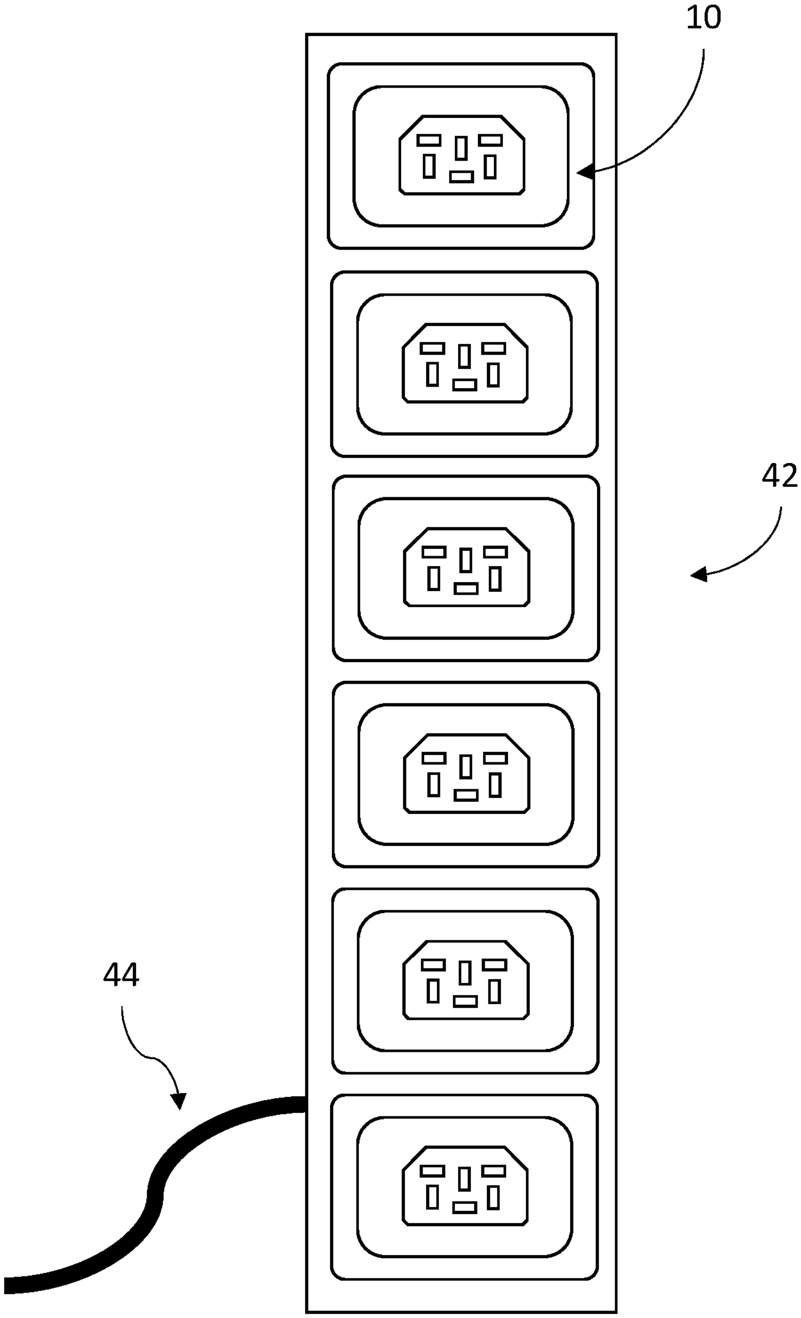
FIG. 5 depicts a power outlet connector bank.

FIG. 5 shows a power outlet connector bank 42. A power outlet connector bank may be referred to as power distribution unit (PDU), as well. It can be used for supplying operating power to electrical equipment in, e.g., computing facilities, such as data centers, server farms, etc. (not shown). Such computing facilities may include electronic equipment racks that comprise rectangular or box-shaped housings sometimes referred to as a cabinet or a rack and associated components for mounting equipment, associated communication cables, and associated power distribution cables. Electronic equipment may be mounted in such racks such that various electronic devices (e.g., network switches, routers, servers and the like) can be aligned vertically, one on top of the other, in the rack. One or more of the shown power outlet connector bank 42 may be used to provide power to the electronic equipment. Multiple racks may be oriented side-by-side, with each containing numerous electronic components and having substantial quantities of associated component wiring located both within and outside of the area occupied by the racks.

The power outlet connector bank 42 comprises a plurality of power outlet modules 10 that may be used to provide operating power to one or more separate electronic appliances (not shown). A cord 44 is for supplying the power outlet connector bank 42 with electrical power from a power source (not shown). Each of the power outlet modules can achieve combined connection with plugs of distinct connector type, e.g., a plug connector E or a plug connector I.

This further advantageously eliminates the necessity to provide the power outlet connector bank 42 with a plurality of power outlet modules of a first connector type and a plurality of power outlet modules of a second connector type, e.g., three F power outlet modules and three J power outlet modules. The inventive power outlet connector bank 42 allows increased versatility since an increased number of connections can be combined. Therefore, the power outlet density within the power outlet connector bank 42 can be increased. This in turn can advantageously result in higher densities of computing equipment within a rack.

Figure 1B:
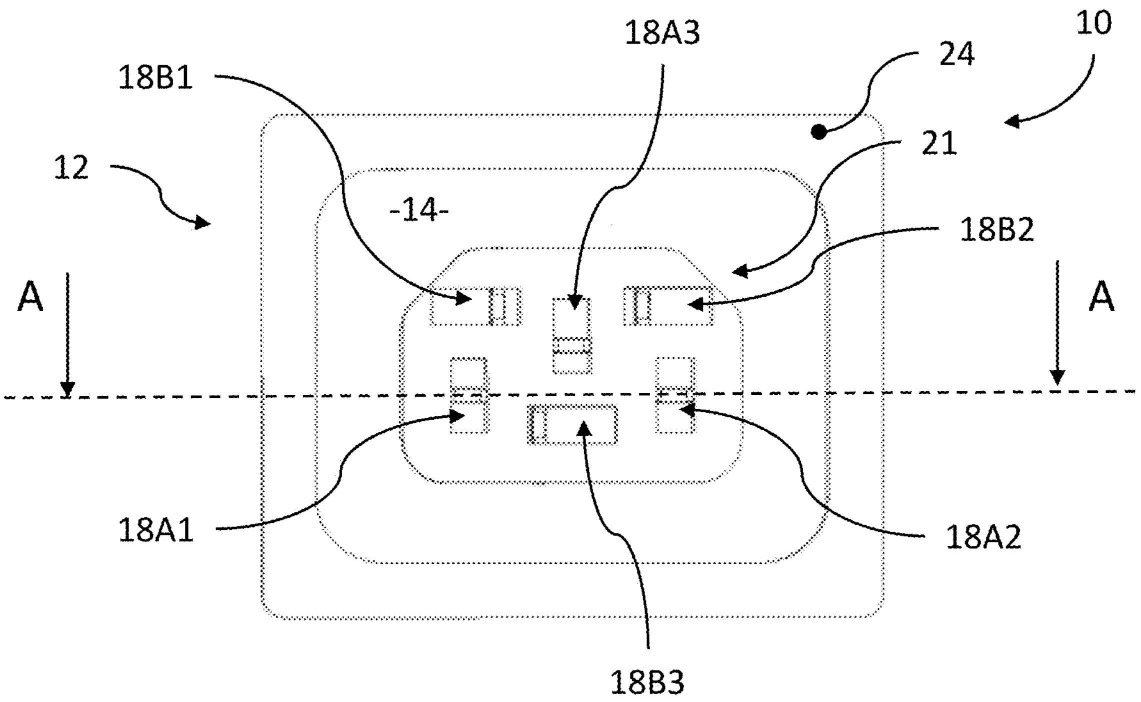
Figure 6:
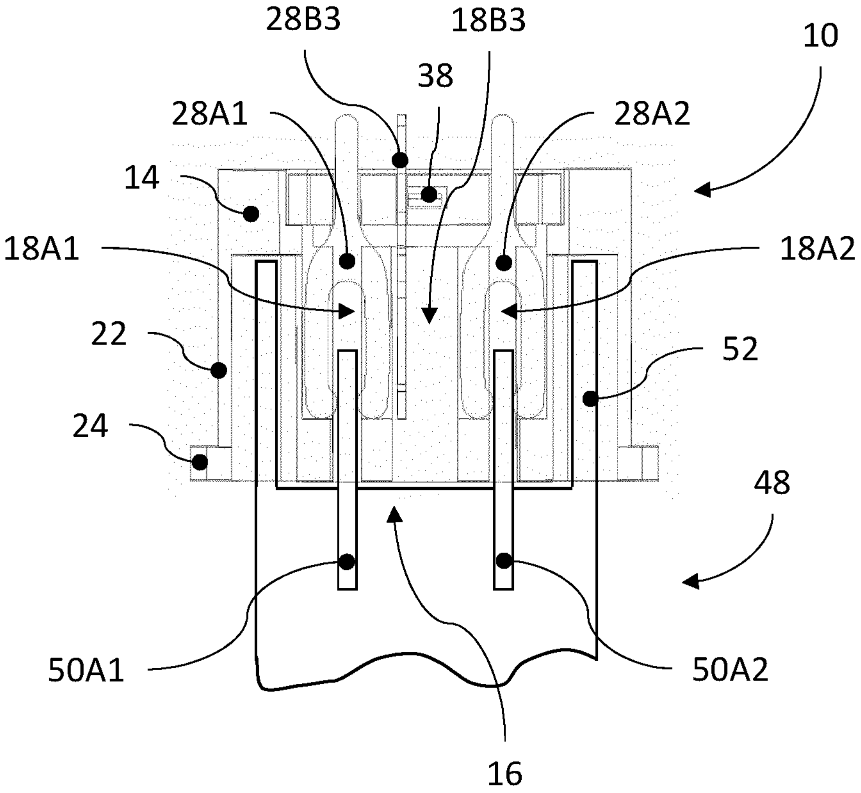
FIG. 6 depicts a two-part electrical coupling system in a section view.

FIG. 6 depicts a two-part electrical coupling system 46 in a section view, cut in a plane indicated by arrows A-A in FIG. 1*b*. The two-part electrical coupling system 46 includes the power outlet module 10 and a plug 48 connected to e.g., an electronic appliance (not shown). The outlet module 10 comprises terminals 28A1,28A2,28B3. The terminals 28A1 and 28A2 thereof are received in recesses 18A1,18A2 comprised by the above mentioned first set of recesses, while the terminal 28B3 is received in a recess 18B3 comprised by the above mentioned second set of recesses (refer to FIGS. 1*a,b*).

The plug 48 is connected to the power outlet module 10 by male connectors 50A1,50A2 received in recesses 18A1, 18A2 and further sandwiched by terminals 28A1,28A2. While not shown, a further male connector comprised by the plug 48 can be received in recess 18A3 and sandwiched by a further terminal (refer to FIGS. 1*a,b*). The recess 18B3 is part of a distinct set of recesses, e.g., the above mentioned second set of recesses.

The male connectors 50A1,50A2 are of electrically conductive material, establishing electrical connection with the terminals 28A1,28A2 once connected. The male connectors 50A1,50A2, at portions thereof inside the plug 48, can be connected with electrical leads, a wiring, a printed circuit board, etc. (not shown), used to supply a power received by the outlet module 10 to e.g., the electronic appliance. Further, the plug 48 can mechanically connected to the power outlet module 10 by a rim 52 comprised by the plug 48, said rim 52 can be received into a space of the power outlet module 10 defined between the outlet core 16 and the sidewall 22. The rim 52 of a plug of e.g., a first connector type can have an inner periphery complying with the outer periphery of the outlet core 16 as is the case in the shown example. Alternatively, the rim 52 of a plug of e.g., a second connector type can have an outer periphery complying with the inner periphery of the sidewall 22. Hence, advantageously, plugs of two distinct connector types can be connected to the power outlet module 10, respectively. While not shown, the outlet core can further comprise means for preventing incorrect coupling, e.g., at least one keying element along the periphery of the outlet core 16. Therefore, incorrect coupling can be prevented. As shown in FIG. 6, the two-part electrical coupling system 46 can comprise the power outlet module 10 and the plug 48. While not shown, the two-part electrical coupling system 46 can comprise a power outlet connector bank 42, as e.g., shown in FIG. 5, and the plug 48.

Features of a standard extension can be included into the present invention. For example, additional outlet geometries can be defined for use at higher temperatures, as for example in the so-called "E_veryhot" version of plug connector E. In an example, additional mechanical codes can be provided to distinguish, within a power class, between temperatures for which the outlets are approved. In an example, a plug connector, at the outer face thereof, can be provided with additional grooves as coding or keying elements. Provided the plug and power outlet module are of the same temperature class, said grooves are matching with protrusions correspondingly provided at the flange of the power outlet module, otherwise no keying can be achieved.

The invention claimed is:

1. A power outlet module comprising an electrically insulating unitary body, said unitary body comprising a base and an outlet core extending from said base, wherein said outlet core comprises a plurality of recesses extending in longitudinal direction thereof, further comprising a plurality of terminals made of an electrically conductive material each positioned in one of the plurality of recesses, wherein the terminals each extend in a plane, each terminal including two legs extending in parallel to each other, facing each other with a predetermined gap in-between, wherein the two legs at one end merge into a merging portion, said legs being bendable via the merging portion in a direction parallel to the plane, wherein inner walls of each of the recesses are formed with two slits (S) extending in an axial direction of the recesses such to face each other, and wherein the slits (S) of each of the recesses receive the legs of the terminals.

2. The power outlet module according to claim 1, wherein the slits (S) extend along the recesses in a portion thereof between the base and a position being distant from a distal end of the outlet core by a predetermined length.

3. The power outlet module according to claim 1, further comprising means for preventing incorrect coupling.

4. The power outlet module according to claim 3, wherein the means for preventing incorrect coupling comprises at least one keying element along the periphery of the outlet core.

5. The power outlet module according to claim 1, further comprising a sidewall extending from said base, said sidewall surrounding the base.

6. The power outlet module according to claim 5, wherein the outlet core comprises a periphery adapted to mate with an inner surface of a first connector type, and wherein the sidewall comprises a periphery adapted to mate with an outer surface of a second connector type.

7. The power outlet module according to claim 6, wherein the recesses comprise a first set of recesses and a second set of recesses, wherein said first set of recesses are arranged and dimensioned such to mate with male connectors of the first connector type, and said second set of recesses are arranged and dimensioned such to mate with male connectors of the second connector type.

8. The power outlet module according to claim 1, wherein the distal end of the outlet core defines a front face having apertures, wherein the recesses extend into the apertures.

9. The power outlet module according to claim 8, wherein each of the apertures is formed oblong.

10. The power outlet module according to claim 9, wherein the terminals each are received into the slits (S) of the recesses such that the plane of each of the terminals is perpendicular to the oblong extension of the apertures.

11. The power outlet module according to claim 1, wherein the terminals each comprise a pin portion extending from the merging portion.

12. The power outlet module according to claim 11, further comprising a lid adapted to be engaged with the base, said lid comprises a plurality of conducts positioned such to be penetrated by the pin portions of the inserted terminals.

13. A power outlet connector bank comprising at least one power outlet module according to claim 1.

14. A two-part electrical coupling system comprising as first part the power outlet module according to claim 1, and comprising as second part a plug releasably connectable to the first part, wherein the plug has male connectors arranged and dimensioned to fit into corresponding recesses of the first part and to establish electrical connections to corresponding terminals.

* * * * *